(12) United States Patent
Park

(10) Patent No.: US 8,391,675 B2
(45) Date of Patent: Mar. 5, 2013

(54) METHOD FOR CALCULATING FILE SIZE OF VIDEO DATA

(75) Inventor: Jin-Mo Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 476 days.

(21) Appl. No.: 12/687,904

(22) Filed: Jan. 15, 2010

(65) Prior Publication Data

US 2010/0209077 A1     Aug. 19, 2010

(30) Foreign Application Priority Data

Feb. 17, 2009  (KR) .................. 10-2009-0013013
Oct. 21, 2009  (KR) .................. 10-2009-0100368

(51) Int. Cl.
*H04N 9/80* (2006.01)
(52) U.S. Cl. ...................... 386/241; 386/252
(58) Field of Classification Search .............. None
See application file for complete search history.

(56) References Cited

U.S. PATENT DOCUMENTS

| 7,859,578 B2* | 12/2010 | Kudo .................. 348/231.1 |
| 2002/0133486 A1* | 9/2002 | Yanagihara et al. ........... 707/3 |
| 2004/0028377 A1* | 2/2004 | Inakura .................. 386/68 |
| 2005/0131923 A1* | 6/2005 | Noguchi et al. ............ 707/100 |
| 2010/0049834 A1* | 2/2010 | Maruyama et al. .......... 709/219 |

* cited by examiner

*Primary Examiner* — Huy T Nguyen
(74) *Attorney, Agent, or Firm* — Fish & Richardson P.C.

(57) ABSTRACT

A method for calculating file size of video data stored in a digital video recorder (DVR) device includes storing video data having segments and index data including file size information associated with segments of the video data. The method also includes enabling an interval to export a selected portion of video data among the video data stored in the DVR device to a storage unit. The A method further includes reading the index data including the file size information associated with the video data stored in the DVR device and obtaining file size information from the read the index data in response to the enabled interval In addition, calculating a size of video data to be exported based on the obtained file size information.

18 Claims, 8 Drawing Sheets

FIG.2

| Frame Number | Size(Kbyte) |
|---|---|
| 1 | 3 |
| 2 | 1 |
| 3 | 1 |
| 4 | 2 |
| 5 | 3 |
| ⋮ | ⋮ |
| 9,998 | 2 |
| 9,999 | 1 |
| 10,000 | 2 |
| 10,001 | 3 |
| ⋮ | ⋮ |

METHOD FOR CALCULATING FILE SIZE OF VIDEO DATA

CROSS-REFERENCE TO RELATED APPLICATIONS

The present application claims the benefit of priority under 35 U.S.C. 119 and 35 U.S.C. 365 to Korean Patent Application No. 10-2009-0013013 (filed on Feb. 17, 2009), and Korean Patent Application No. 10-2009-0100368 (filed on Oct. 21, 2009), which are hereby incorporated by reference in their entirety.

FIELD

The present disclosure relates to a method for calculating the file size of an export file.

BACKGROUND

In general, a digital video recorder (DVR) captures a video signal inputted through a surveillance camera, converts the video signal into a high-definition digital video signal, and stores the digital video signal in a storage medium such as a hard disk or an optical disk.

By means of the VDR device, a user can easily search or play recorded videos by time, date, camera and event and can easily perform backup and edit operations. Also, if a plurality of cameras are used, a multiplexer function can be performed to display the videos inputted from the respective cameras on one monitor screen in a divided manner.

The DVR device is a digital video storage device that makes it possible to semipermanently use recorded videos. DVR devices are being widely installed and used in large cut-price stores, parking lots, financial institutions, and airports to check security states.

Recently, DVR devices are widely installed and used in buses, subways and patrol cars to secure evidences for traffic accidents and fatal accidents. Also, since crimes occur frequently along with the society development speed, DVR devices are also installed as security devices in houses.

Video data stored in the DVR device are impossible to play intactly without conversion in external devices such as computers, because their formats are specified. Thus, in order to display video data in external devices, data/time/camera information is specifically designated, video data satisfying the conditions are searched, and the searched video data are converted into a multimedia video file of, for example, an Audio Video Interleave (AVI) file format. The conversion of video data into a multimedia video file is called 'export'.

SUMMARY

In one aspect, a method for calculating a file size of video data in a DVR device includes storing video data, generating index data including file size information of video data for the video data; reading the index data corresponding to an export interval among the video data; and calculating the file size of export video data on the basis of the file size information.

In another aspect, an apparatus for calculation file size of video data in DVR device includes a storage unit configured to store video data and index data including file size information of the video data; a controller configured to read the index data and access file size information corresponding to an export interval among the video data; and an operator configured to calculate the file size of export video data.

The export file size calculation method may be recorded as a computer readable program on a computer readable recording medium.

BRIEF DESCRIPTION OF THE DRAWINGS

FIG. 2 is a table showing an index data structure.

DETAILED DESCRIPTION

Figure 1:
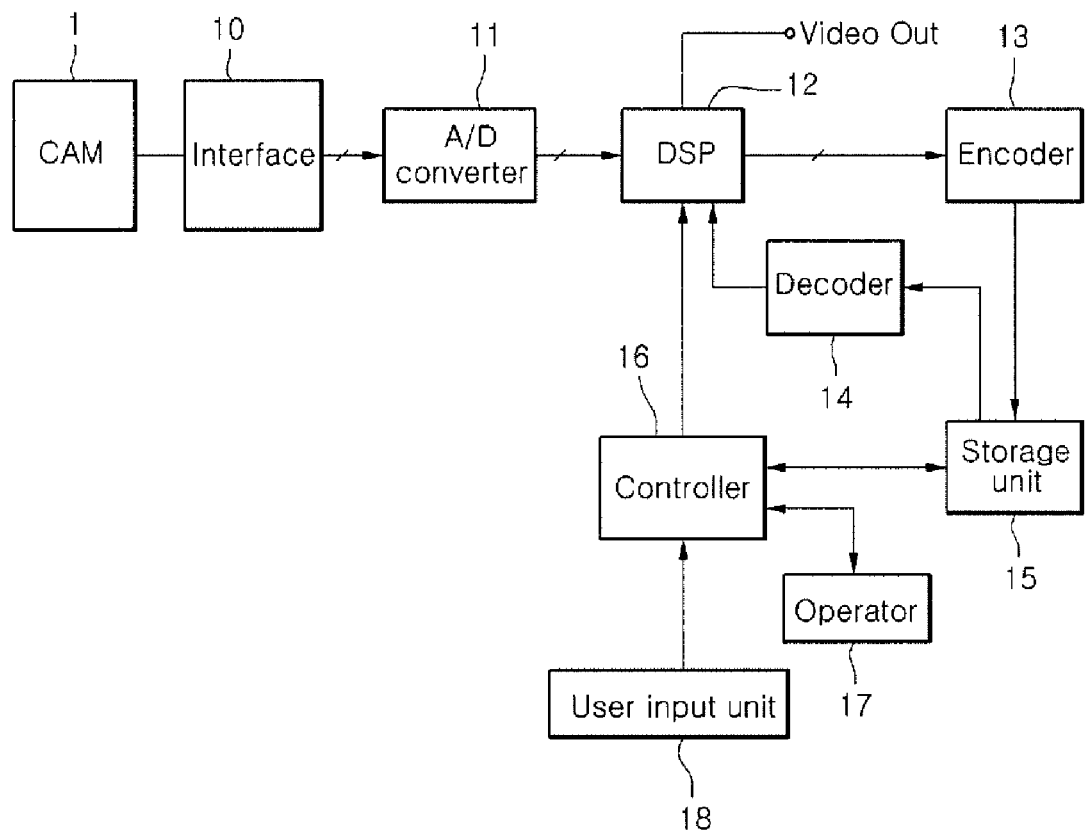
FIG. 1 is a block diagram of a DVR device employing a method for calculating the file size of an export file.

Exemplary embodiments of the present disclosure will be described in detail with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art. Referring to FIG. 1, an apparatus for calculating file size of video data in a DVR device may include an interface 10, an A/D converter 11, a digital signal processor (DSP) 12, an encoder 13, a decoder 14, a storage unit 15, a controller 15, an operator 17, and a user input unit 18.

Analog video signals, outputted from one or more surveillance cameras (CAM) 1 connected through the interface 10, are converted into digital video signals by the A/D converter 11.

Thereafter, the digital video signal is processed into digital video data by the DSP 12, the digital video data are encoded into compressed video data by the encoder 13, and the compressed video data are stored in the storage unit 15 as a video data file.

In this implementation, the encoder 13 encodes the video signal by using a video compression algorithm such as a MPEG algorithm.

In order to read and play the video data stored in the storage unit 15, the decoder 14 decodes the compressed video data into decompressed digital video data. Thereafter, the decompressed digital video data are outputted as a video image through the DSP 12, and the video image is displayed on a display unit such as a monitor.

The DVR device can search or export some or all of the video data stored in the storage 15, and provides the searched video data to a user. Because the user usually wants to review, transfer or watch a portion of video data out of all recorded video stored in the DVR device in surveillance system.

For example, the user extracts a portion of the stored video data (i.e., video data of a specific time slot), converts the extracted video data into a multimedia video file, and stores the multimedia video file in a portable storage unit (e.g., CDs, BDs, portable hard disks, or USB memories). The user may execute an export function, supported by the DVR device, to acquire a video of a desired interval. As an example, the expert function may includes that a portion of video data stored in the DVR is transferred to the portable storage unit based on user input information. The user may input timing information such as start time and end time to acquire a video of a desired interval through GUI interface then the DVR device may execute the expert function in response to the user input.

Also, prior to export, the DVR device calculates the file size of an export file (i.e., a multimedia video converted from the video data to be exported) and provides the size information of the expert file to the user. Accordingly, the user can prepare a memory of a storage capacity suitable for the file size of the video data to be exported.

Hereinafter, a description will be given of a process for the DVR device to calculate the file size of the video data to be exported.

In some implementations, an apparatus for calculating file size of the video data in the DVR device may include a storage unit 15 for storing video data and index data that includes, for example, file size information of video frames; a controller 16 for reading the index data including the file size information of video frames; and an operator 17 for calculating the file size of the video data based on the file size information of the index data.

As described above, the storage unit 15 stores video data that are processed by the DSP. The video data are received from a video capture device such as a camera. The video data are digital-signal-processed and the processed data are encoded into a compressed file of a specific format through a predetermined algorithm such as an MPEG algorithm.

Also, the storage 15 stores index data for the video frames constituting the stored video data. In this implementation, the index data includes file size information of the video frames.

For example, the storage unit 15 stores one-hour video data received from a first camera. If the video data are comprised of 100,000 frames, the storage 15 stores index data including file size information of each frame (i.e., information about 100,000 file sizes of a 200 KB size of the first frame, a 200 KB size of the second frame, . . . , a 390 KB size of the 490$^{th}$ frame, and a 450 KB size of the 491$^{st}$ frame). If there is a motion change in the input video contents, the compression ratio decreases and the size of the video frame increases.

The index data may be stored as a table of video frame numbers and video frame sizes constituting the video data.

Referring to FIG. 2, the index data may include a table of video frame numbers and corresponding video frame size of the video frame numbers. For example, the table shows that a size of frame one is 3 kbyte and frame two is 1 kbyte.

In this implementation, the index data are separately generated and stored from the video data. If the video data have a file name of abc.data, the index data have a file name of abc.index. the index data also may include information about the video aspect. Further, the index data may include information about the recording time of the video frame.

In comparison with the video data, because the index data may not include the video data, the index data may have a small file size and a simple structure. Therefore, the index data can be rapidly read and analyzed by the controller 16.

The controller 16 reads index data to retrieve the video frame corresponding to an export interval among the video data.

In this implementation, if the user wants to export a portion of the video data stored in the storage unit 15, the user may input the export interval through the user input unit 18.

In this case, the controller 16 detects the video frames corresponds to the export interval by reading the index data including file size information of the detected export interval.

For example, if the user intends to export video data of a ten-minute interval among the one-hour video data, the controller 16 reads the index information including the file size information of and searches index data related to the corresponding the ten minute interval. That is, the controller 16 reads a selected index data including file size information of the video frames corresponding to the ten-minute interval.

Alternatively, if the index data include both the size information and the time information of the video frame, the controller 16 can simultaneously obtain the size information of the video frames and time information of the video frames corresponding to the interval.

The operator 17 calculates the file size of the export video data on the basis of the file size information of the frame. The controller 16 may obtain the size information of the video frames corresponding to a selected time interval and sends the information to the operator 17.

The operator 17 adds up the size information to calculate the file size of the export video data.

For example, if the controller 16 sends file size information of 10,000 frames to the operator 16, the operator 17 adds up the 10,000 frame file sizes to calculate the file size of the export video data.

The calculated video data file size may be provided to the user (e.g., displaying a total file size) through an output device such as a display unit. Accordingly, the user can identify the file size of the export video data and can prepare for a memory in which a storage capacity is suitable for the video data.

In this implantation, the above video data file size calculation process is performed prior to export, and it is indicated to the user.

Figure 3:
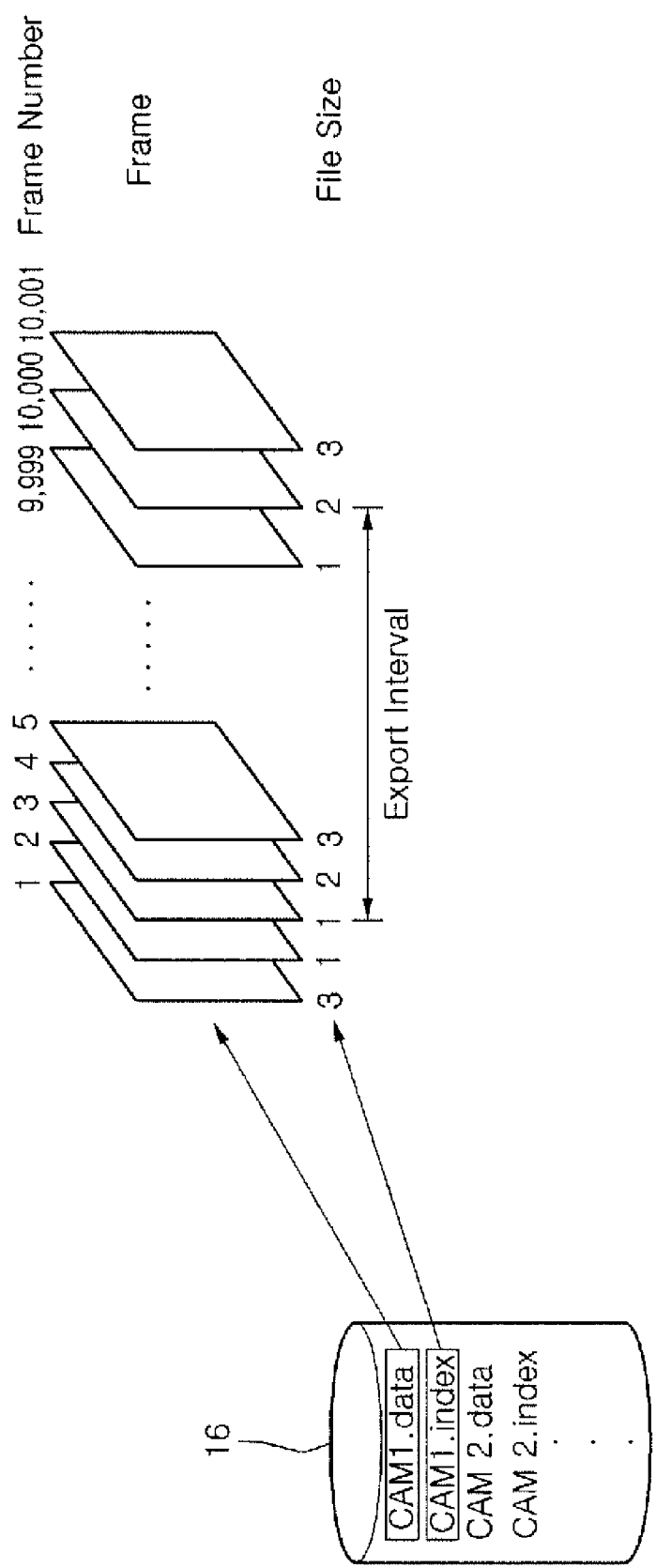
FIG. 3 is a diagram showing an export file size calculation method.

Referring to FIG. 3, the storage unit 15 stores not only video data, for example, CAM1.data and CAM2.data but also index data, for example, CAM1.index and CAM2.index. The index data may include file size information of the video frames or time information of the video frames.

If the time or interval for export is inputted by the user, the controller 16 reads the index data (CAM1.index in FIG. 3) and selects file size information or timing information of the video frames corresponding to the export interval.

Thereafter, the file size of the export video data is calculated on the basis of the file size information or timing information included in the read index data.

In FIG. 3, for example, the export interval frames are 3$^{rd}$ to 10,000$^{th}$, and the controller 16 reads the file sizes of 3$^{rd}$ to 10,000$^{th}$ frames (i.e., the export interval frames) from the index data (CAM1.index) stored in the storage unit 15.

Thereafter, the operator 17 adds up the file sizes of the 3$^{rd}$ to 10,000$^{th}$ frames to calculate the file size of the export video data.

Figure 4:
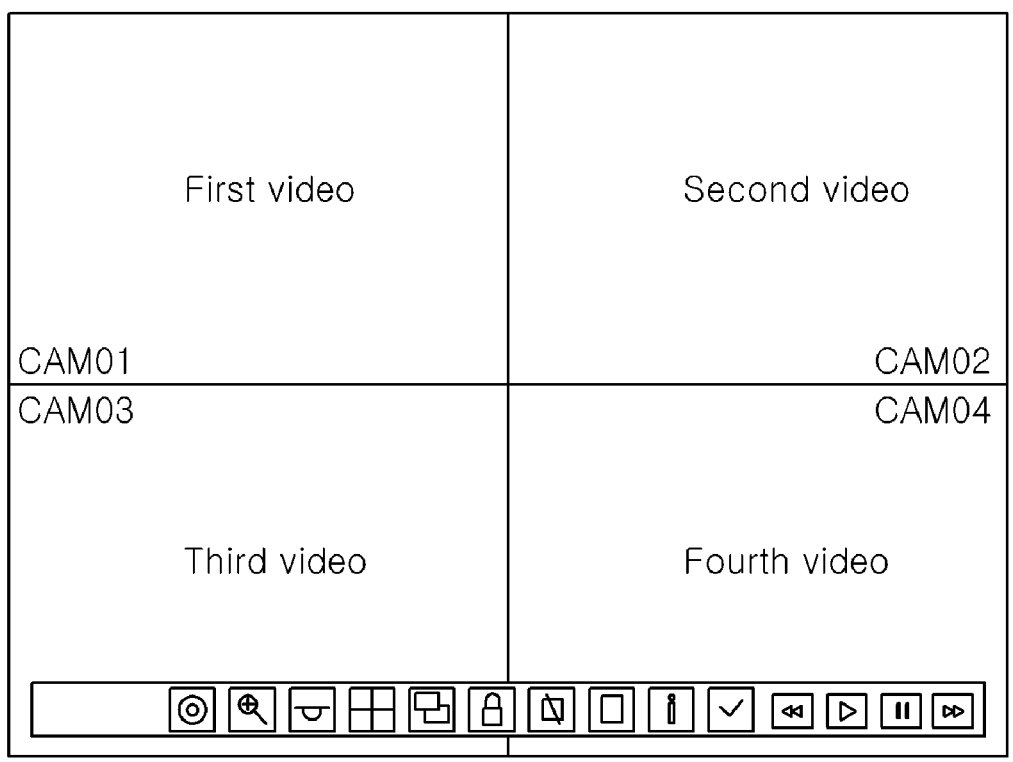
FIGS. 4 to 7 are diagrams showing an export file size providing process of a DVR device.

FIG. 4 shows a screen displayed on a display (e.g., a monitor) connected to the DVR device.

As shown in FIG. 4, the DVR device receives video signals from a plurality of cameras. The received video signals may be converted into digital signals, the digital signals are encoded into compressed video data through a predetermined compression algorithm, and the compressed video data are stored in the storage unit 15.

In this implementation, video signals may be acquired from the cameras (e.g., CAM1 to CAM4) are converted into different video data for the respective cameras, and the video data are stored in the storage unit 15.

For example, a first video signal acquired from CAM1 is converted into CAM1.data to be stored in the storage unit 15, and a second video signal acquired from CAM2 is converted into CAM2.data to be stored in the storage unit 15. Consequently, the storage 15 stores a total of four video data files (i.e., CAM1.data, CAM2.data, CAM3.data and CAM4.data).

referring to FIG. 4, the DVR device may reconstruct videos acquired from a plurality of cameras into one video frame, and stores the reconfigured video as one video data in the storage unit 15.

For example, as shown in FIG. 4, four video frames (i.e., first to fourth videos) are reconstructed into one video frame, the reconstructed video frame may be generated as one video data file (e.g., CAM.data), and the video data file is stored in the storage unit 15.

In some examples, when the user executes an export function of the DVR device, the DVR device displays at least one messages for setting the details of the export through a display.

Figure 5:
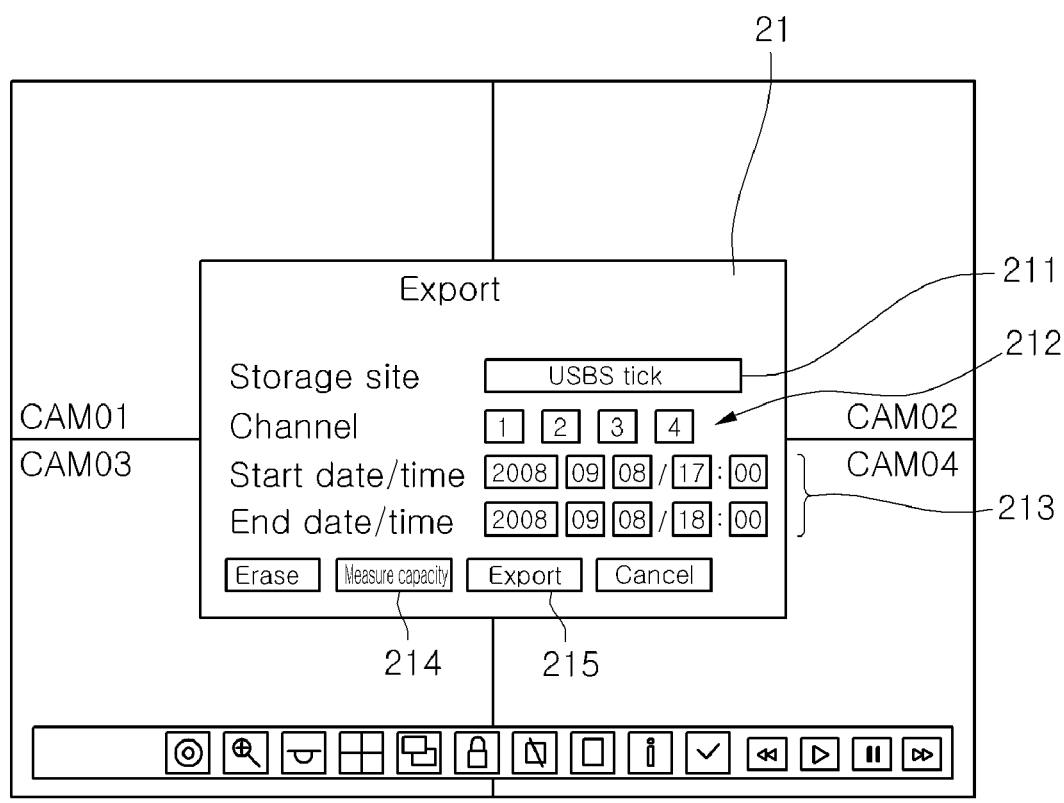

For example, as shown in FIG. 5, the controller 16 of the DVR device controls the Digital Signal Processor (DSP) 12 to display a GUI-type message window 21 for setting the details of the export on the display unit. Through interfacing with the message window 21, the user select a type of a storage medium 211 or a type of a storage site to export a selected video data to the selected storage medium or site, selects an export video 212 among the videos acquired from a plurality of cameras, and sets an export interval 213 among the video data. For example, the user can select one or more channels among video.

In addition, a size estimating menu 214 is provided to estimate the file size of a multimedia video to be generated in the export.

The DVR device further includes the user input unit 18 to receive information about the export file storage site, the export video and the export interval from the user.

If the user enables a capacity measurement menu 214 after setting the details of the export, the DVR device calculates the file size of the export video data by the above export file size measurement method.

Figure 6:
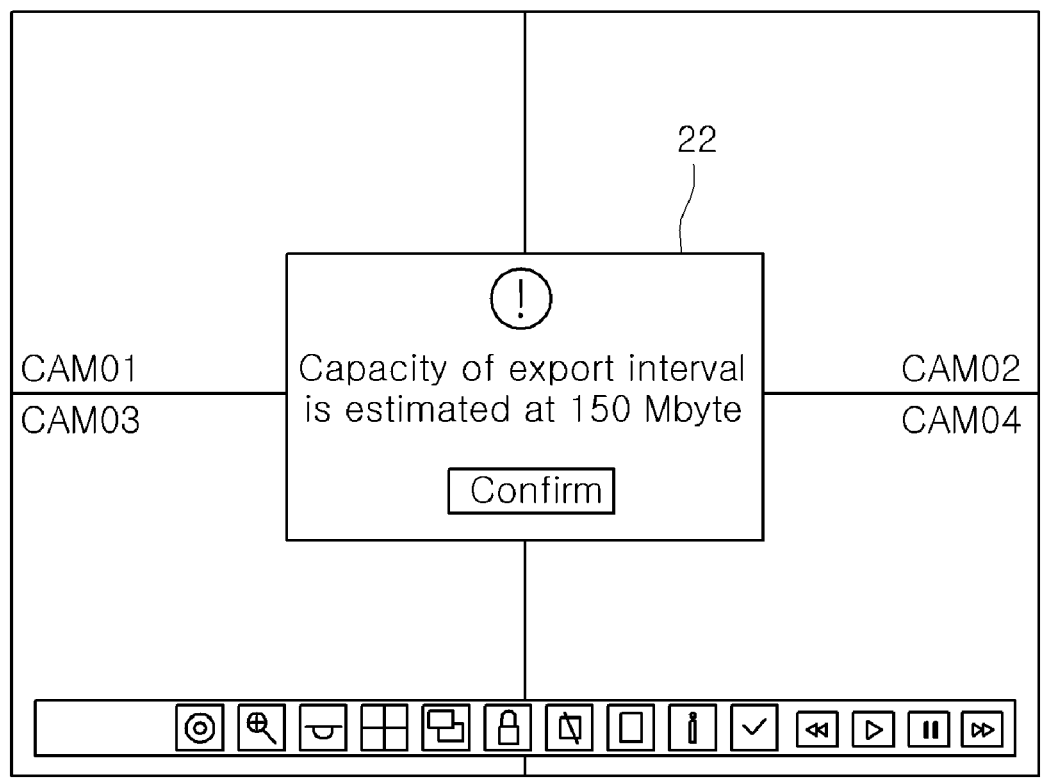

Thereafter, as shown in FIG. 6, the controller 16 of the DVR device displays a calculated file size on a GUI-type pop-up window 22.

Thus, the user can detect the file size of the export file before execution of the export function, and can prepare a storage medium suitable for the file size to store the export file.

Also, a separate index file without recording information about the file size of the frame to the video file data including the video signal, thereby making it possible to rapidly measuring the file size.

That is, the time taken to measure the file size of the export file can be minimized because a small and simple index file is analyzed to extract the file size of the frame without the need to analyze large video data to extract file size information of the video frame.

After detecting the file size of the export file calculated through the above process, the user enables an export menu 215. Consequently, as illustrated in FIG. 7, the DVR device executes the export video images corresponding to the interval set by the user.

In this implementation, the DVR device displays and outputs the time taken for the export to the user. For example, as shown in FIG. 7, the DVR device displays and provides the remaining time until completion of the export through a pop-up window 23 to the user.

Figure 7:
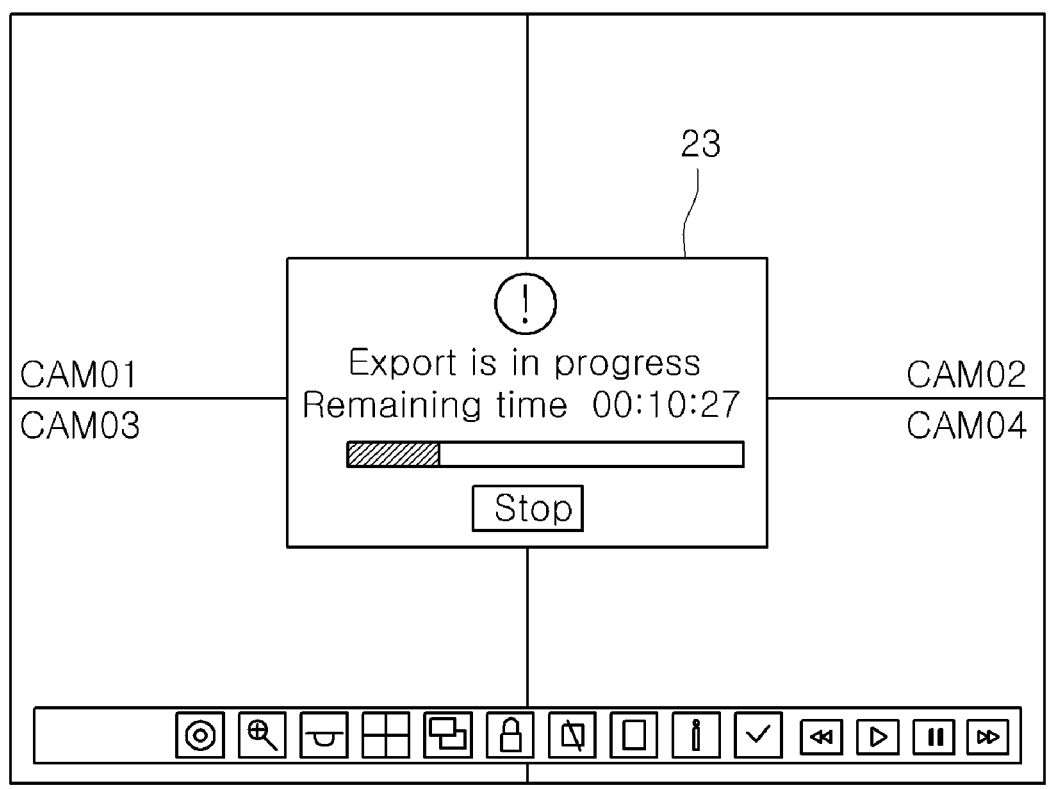

For example, the apparatus having the DVR device displays the progress of the export to the user As shown in FIG. 7, the apparatus displays the progress of the export in a progressive bar type on the pop-up window 23 to the user.

For a source video file including multiple frames, we compute the size of each frame and we store the frame sizes in an index file (e.g., FIG. 2) that is separate from the source video file. Relative to the source video file, the index file has a small size and a simple file structure that enables relatively quick reading and analysis. When a segment of the source video file is selected for export, corresponding frames are identified, and a determination of the aggregated size of the identified frames is made. That is, if the start and end point of a segment of video is selected for export, the corresponding frames are identified, as are the span of segments there between, and the size of all such identified segments are identified and summed using the index.

The resultant size may be displayed or otherwise used to control or throttle the video segment export. For instance, a user may be shown the size information, and made able to stall or abort the export process based on the size information (e.g., see FIG. 6). Therefore, a simple index file (FIG. 2) is leveraged by using known start/stop times, and in doing so, the sizes of video frames that corresponding to video spanning the start and stop times are looked up and aggregated/added, quickly and efficiently.

Figure 8:
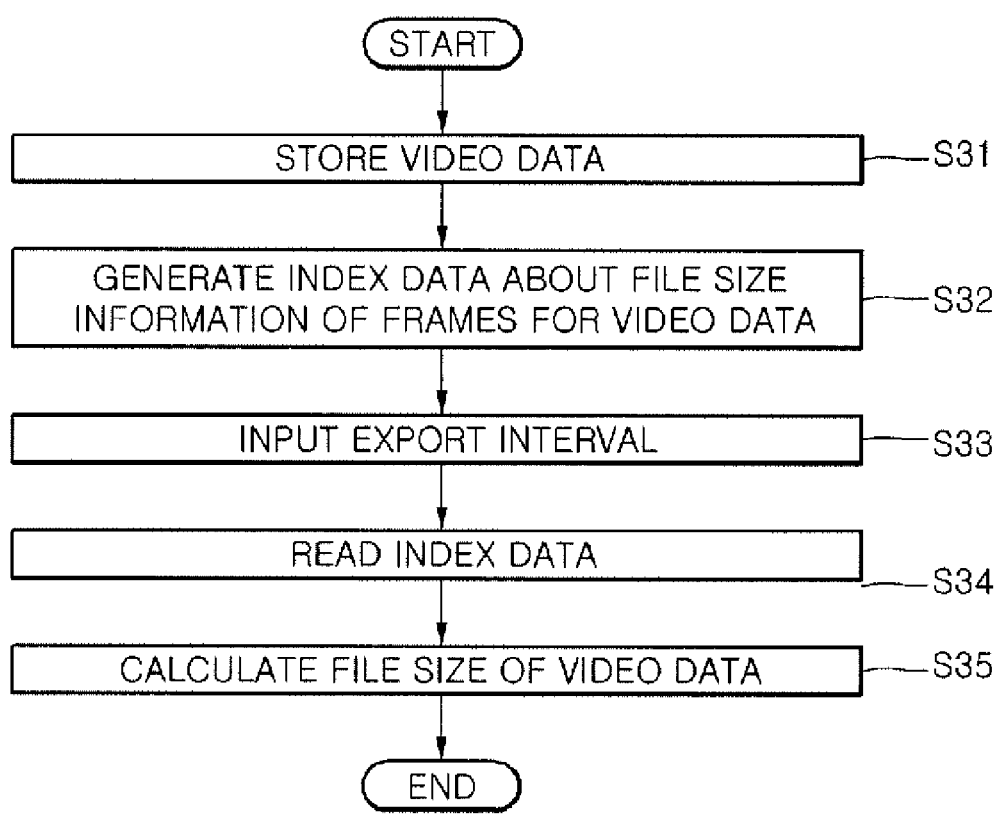
FIG. 8 is a flow chart illustrating an export file size measurement method.

Referring to FIG. 8, an export file size measurement method may include storing video data (S31), generating and storing index data including file size information of video frames for the video data (S32), inputting an export time or interval (S33), reading index data and select index data corresponding to the export interval; and calculating the file size of video data corresponding to the export interval. The export file size measurement method may further include displaying the calculated file size on the display unit.

The step S31 stores video data. The video data may be collected from an image capture device such as a camera and may be processed by the DSP 12 prior to storage. The output video signal for the DSP may be stored in the storage unit 15 as a compressed file of a specific format through a predetermined algorithm.

The step S32 generates index data including file size information of the video frames. The index data are generated and stored separately from the video data. The index data include file size information of frames for the video data, which is used to calculate the file size of the video data.

The index data may include the time information as well as the file size information of the video frames.

The step S33 inputs an export time or interval among the stored video data. An interval among the stored video data, for example, a ten-minute or one-hour interval is inputted by the user to set an export interval. In this implementation, an export start time and an export end time can be inputted by the user to set an export interval. Alternatively, an export start time and a time interval are inputted to set an export interval.

The step S34 reads index data including size information of video frames and selects size information of video frames in response to the imputed export interval. That is, when an export interval is set, the controller 16 reads the file size information of the index data in response to the set export interval.

In this implementation, when the index data also include time information of the video frames, the time information corresponding to the video frame corresponding to the set export interval can be read by the controller 16 and used when the apparatus calculates the file size of export video data or frames.

The step S35 calculates the file size of export video data on the basis of the file size information of the video data included in the read index data. For example, the index data may include the file sizes of the video frames included in the export interval.

The above export file size measurement process is performed before execution of export and may be indicated to the user in advance. Accordingly, the user can rapidly detect the accurate file size of the export video data.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method for calculating file size of video data stored in a digital video recorder (DVR) device, the method comprising:
storing video data having segments and index data including file size associated with segments of the video data;
enabling an interval to export a selected portion of video data among the video data stored in the DVR device to a storage unit;
reading the index data including the file size associated with the video data stored in the DVR device and obtaining file sizes of video frames from the read index data in response to the enabled interval; and
calculating a size of video data to be exported based on the obtained file sizes.

2. The method of claim 1, wherein enabling the interval comprises:
inputting the interval by using an input menu displayed on display unit.

3. The method of claim 1, wherein each of the file sizes indicates a file size of a video frame.

4. The method of claim 3, wherein calculating the size of the video data comprises:
summing the obtained each of the file sizes of the video frames.

5. The method of claim 1, wherein the index data are separately from the video data.

6. The method of claim 1, wherein the index data further include time information of the video data.

7. The method of claim 1, further comprising:
displaying the calculated file size of the video data on a display unit.

8. The method of claim 2, wherein inputting the interval comprises:
inputting start time and end time of the video data stored in the DVR device.

9. The method of claim 1, wherein enabling the interval further comprises:
selecting the storage unit or a storage site to store the video data to be exported from the DVR device.

10. The method of claim 1, wherein enabling the interval further comprises:
selecting a type of video data stored in the DVR to be exported to a storage unit.

11. A method for calculating file size of video data stored in a digital video recorder (DVR) device, the method comprising:
enabling an interval to export a portion of video data among the video data stored in the DVR device to a storage unit, wherein the video data having segments;
reading file size information associated with segments of the video data stored in the DVR device and selecting file size information associated with segments of the video data to be exported in response to the enabled interval;
calculating a size of video data to be exported based on the obtained file size information; and
displaying the calculated file size of the video data on a display unit,
wherein the file size information includes a file size of a video frame and timing information of the video frame.

12. The method of claim 11, further comprising:
selecting a capacity measurement icon to display the calculated file size of the video data on a display unit.

13. The method of claim 11, further comprising:
displaying information whether a capacity of the storage unit is available before the video data export to the storage unit.

14. The method of claim 11, further comprising:
displaying a status of export of the video data when the export is in progress.

15. An apparatus for calculating file size of video data stored in digital video recorder (DVR) device, the apparatus comprising:
a storage unit configured to store video data having segments and index data including file size associated with segments of the video data;
an input unit configured to input an interval to export a portion of video data among the video data to another storage unit;
a controller configured to read the index data including the file size of the video data stored in the DVR device and obtain file sizes of video frames from the read index data in response to the inputted interval; and
an operation unit configured to calculate a size of video data to be exported based on the obtained file sizes.

16. The apparatus of claim 15, further comprising a display unit configured to display information indicating whether a capacity of the storage unit is available before the video data export to the storage unit.

17. The apparatus of claim 15, further comprising a display unit configured to display a status of export of the video data when the export is in progress.

18. A method for providing a file size of an export file executed in a digital video recorder (DVR) device, the method comprising:
storing video data;
generating index data about file size information of frames for the video data;
reading the index data about the frame included in an export interval among the video data; and
calculating the file size of export video data on the basis of the file size information included in the read index data,
wherein the file size information includes file sizes of the frames.

* * * * *